(12) United States Patent
Kasdorf

(10) Patent No.: US 7,176,591 B2
(45) Date of Patent: Feb. 13, 2007

(54) POT-LIKE OR CUP-LIKE CARRIER

(75) Inventor: Wolfgang Kasdorf, Aarbergen (DE)

(73) Assignee: K-TEC Kunststoffverarbeitung GmbH, Schmitten (DE)

( * ) Notice: Subject to any disclaimer, the term of this patent is extended or adjusted under 35 U.S.C. 154(b) by 0 days.

(21) Appl. No.: 10/937,885

(22) Filed: Sep. 10, 2004

(65) Prior Publication Data

US 2005/0134128 A1    Jun. 23, 2005

(30) Foreign Application Priority Data

Sep. 11, 2003   (DE)   ................. 103 42 219

(51) Int. Cl.
*H02K 15/00*   (2006.01)
(52) U.S. Cl. .......................... 310/42; 310/89
(58) Field of Classification Search ................. 310/42, 310/89, 238, 239, 241, 242, 246–249
See application file for complete search history.

(56) References Cited

U.S. PATENT DOCUMENTS

| | | | | |
|---|---|---|---|---|
| 2,650,992 | A | * | 9/1953 | Forss et al. .................... 310/42 |
| 5,013,952 | A | * | 5/1991 | Sekine et al. ................ 310/239 |
| 5,148,073 | A | * | 9/1992 | Tamura ....................... 310/239 |
| 5,382,857 | A | * | 1/1995 | Schellhorn et al. ............ 310/83 |
| 5,440,186 | A | | 8/1995 | Forsell et al. |
| 5,886,448 | A | * | 3/1999 | Yoshida ....................... 310/249 |
| 6,317,332 | B1 | * | 11/2001 | Weber et al. ................ 361/760 |
| 6,459,188 | B1 | * | 10/2002 | Lombardo et al. .......... 310/239 |

FOREIGN PATENT DOCUMENTS

| | | |
|---|---|---|
| DE | 3810960 | 10/1989 |
| DE | 9116586 | 8/1993 |
| DE | 29506698 | 8/1995 |
| DE | 9420291 | 11/1995 |
| EP | 0219681 | 12/1987 |
| EP | 0432283 | 6/1991 |
| EP | 0823768 | 2/1998 |

* cited by examiner

*Primary Examiner*—Dang Le
(74) *Attorney, Agent, or Firm*—Dennison, Schultz & MacDonald

(57) ABSTRACT

The invention relates to a system consisting of carbon brushed and circular pot-like carriers (10) having at least one electrical interconnection and surrounding a commutator of a motor, and a frame (18) that projects peripherally over the carrier and can be fixed into position between a motor housing and a transmission housing, proceeding from the peripheral surface of the carrier. In order to attain a simplification in the manufacture of carriers for different applications, it is proposed that the carrier be connected form and/or force-locking to one frame of several frames of different configurations via locking projections (22, 24) and locking recesses (25, 26).

13 Claims, 6 Drawing Sheets

POT-LIKE OR CUP-LIKE CARRIER

Figure 1:
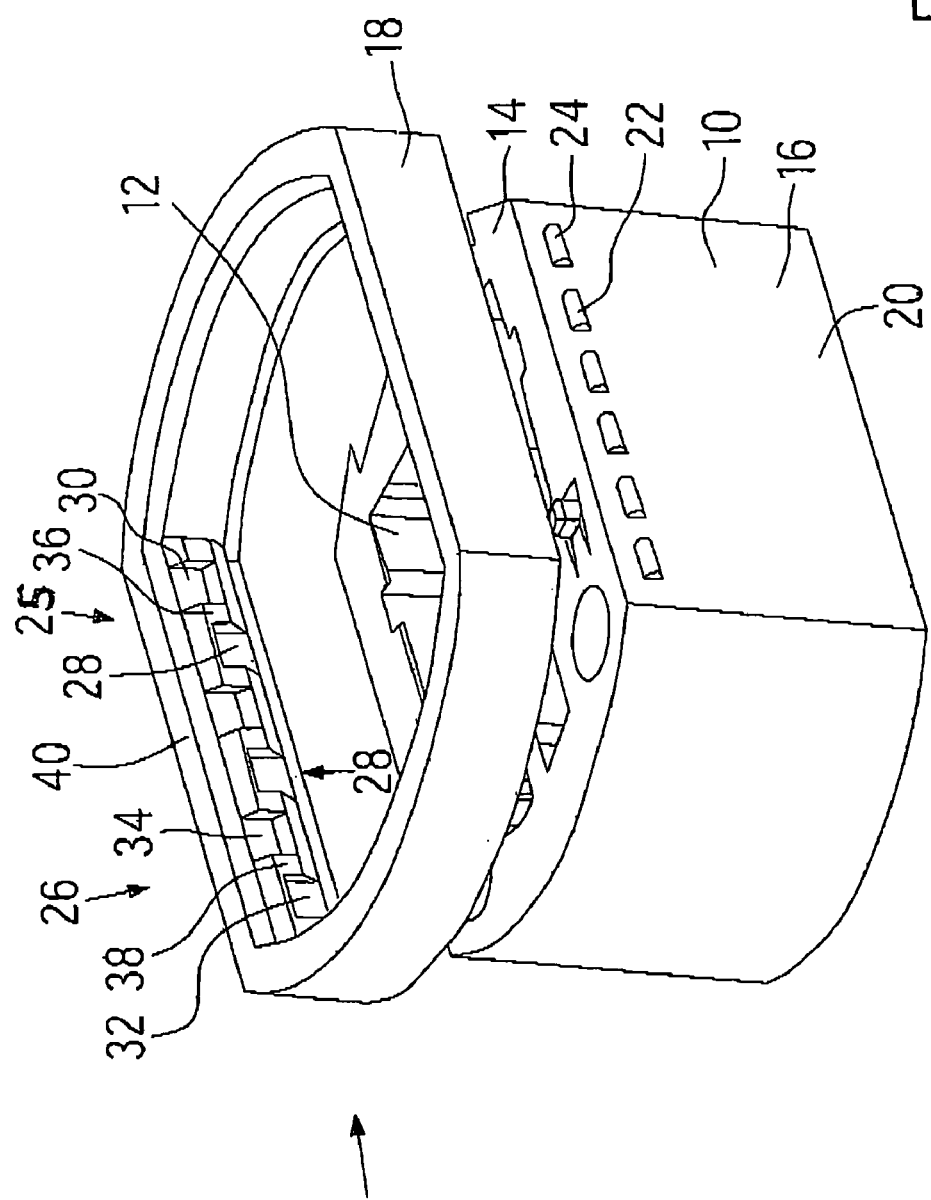

The invention relates to a system consisting of a carbon brush and at least one pot-like carrier having at least one electrical interconnection and surrounding a commutator of a motor, and a frame that proceeds from the peripheral surface of the carrier projecting peripherally over the carrier, which can be fixed into position between a motor housing and a transmission housing. Furthermore, the invention makes reference to a pot-like or cup-like carrier for accommodating carbon brushes and an electrical interconnection such as stamping lattices, along with electric and electronic components such as a choke, a condenser or a thermostat if necessary, including an especially circular frame that projects over the external surface of the carrier, via which the carrier can be fixed into position especially between a motor housing and a transmission housing.

A corresponding carrier is to be inferred from EP 0 823 768 B1, example. The carrier, which fulfills the function of a brush holder, into which electrical and electronic components are incorporated, is designed in particular for servomotors for, for example, window raisers, seat adjustment systems and sliding roofs of motor vehicles. The commutator of the motor extends inside the carrier on which the carbon brushes lie under spring action. For this, the carrier is accommodated by a motor housing, and the frame, also to be designated as a ring or a flange, is clamped fast between the motor housing and a transmission housing.

The electrical and electronic components as well as the electrical interconnection preferably proceed from a partition of the support that extends on the transmission side, which can also be designated as a floor partition.

Frequently it is necessary for a seal that proceeds from the carrier to extend between the housing elements. For this, a flat seal can be applied to the exterior of the floor partition in the two-component injection method described in DE-C-38 10 960.

A motor transmission unit can also be inferred from EP-A-0 219 681. A bushing is injection molded onto the seal that runs between the housing elements, in order to allow the necessary electrical connections to be made in the motor housing component.

In practice, due to the multitude of possible applications and model variations, different connections for the power supply source are required. It is therefore necessary to undertake a separate sampling for each carrier to be correspondingly constructed. This requires time and money since it must be assured that the components are adjusted for a geometrically precise fit in relation to one another.

One motor transmission unit is known from EP-A-432 283 in which a seal can be braced between the motor housing and the transmission housing, and can be designed to be integral with a cover for closing a carrier. The cover, which can be latched with the support, transitions peripherally aligning into the external surface of the carrier. A corresponding design is also to be inferred from DE-U-91 16 586.

DE-U-295 06 698 proposes a two-part housing that can be connected via locking connections for accommodating electrical circuits.

A groove-spring connection is provided according to DE-U-94 20 291 for the purpose of connecting housing elements.

A motor-transmission unit according to U.S. Pat. No. 5,440,186 provides a carrier that extends with an edge between the motor housing and the transmission housing that is penetrable by electrical terminals.

The present invention is based upon the problem of further developing the system such that a simplification of the manufacture and sampling of the unit consisting of the carrier and frame is made possible.

To solve the problem, the invention provides that the carrier can be connected form and/or force locking with a frame of several frames of different configurations, via locking projections and locking recesses.

An almost modular system is made available in accordance with the invention, in which a carrier type can be used for differently configured frames or electrical terminals proceeding from the frame. This results in a simplification of manufacture and in particular also sampling, for a carrier of identical construction can be used for different purposes with different frames or electrical terminals that are passed over the frames.

Furthermore, to attain the objective underlying the invention, a carrier of the type mentioned at the beginning is refined such that the frame and the carrier are separately manufactured components, such that the frame is connected form and/or force locking with the carrier via locking projections and locking recesses, wherein the locking recesses consist of successive first and second locking elements that form semicircular receptacles for external sections of locking projections in projection along a straight line in section.

Furthermore, the locking recesses can project from the interior of the frame to which the locking projections that project over the external partition or surface of the housing are allocated.

The locking recesses have first and second locking elements that successively almost supplement one another into a locking recess in which locking projections engage form-locking and free of play. When the frame is locked in, one of the locking elements ensures that a displacement of the frame in one direction is ruled out, while in contrast the other locking element prohibits motion in the other direction. Moreover the first and second locking elements form a groove-like receptacle for the locking projections along a straight line in section. In this, the first locking elements are preferably separated by pegs that run perpendicular to the plane clamped by the frame.

It is provided in further development of the invention that the frame is latched with the carrier preferably exclusively in regions in which the carrier has an especially high rigidity. This is true for the corner regions.

The locking projections are preferably comprised by an internal cuboidal section proceeding from the external surface of the carrier and a semicylindrical external section that pass over flush into each other.

The first or second locking element is supposed to be comprised by a ramp-like outer section and an internal section with a concavely running outer surface following a quarter circle that transitions flush into the internal surface or interior of the frame. Preferably a plateau-like third section running parallel toward the corresponding inner surface of the frame between the external section and the internal section is present.

The first and second locking elements are oriented in opposite directions toward each other so that as mentioned, a groove is formed by the locking elements without elements even having to be present in a tool with which the frame is injection molded in order to be able to construct a groove.

It is provided in refinement of the invention that the frame is encapsulated with a sealing material that extends along free external surfaces of the frame.

Furthermore, an insert for an external plug can proceed from the frame. Moreover, frames with different external plugs can be allocated to one and the same housing, and thus locked with it, so that a modular system results as mentioned.

The frame itself, the internal surface of which runs at a distance from the external partition of the carrier, should follow a geometrical course corresponding to the external partition. Moreover, the frame has a rectangular cross section in relation to its segment.

Figure 2:
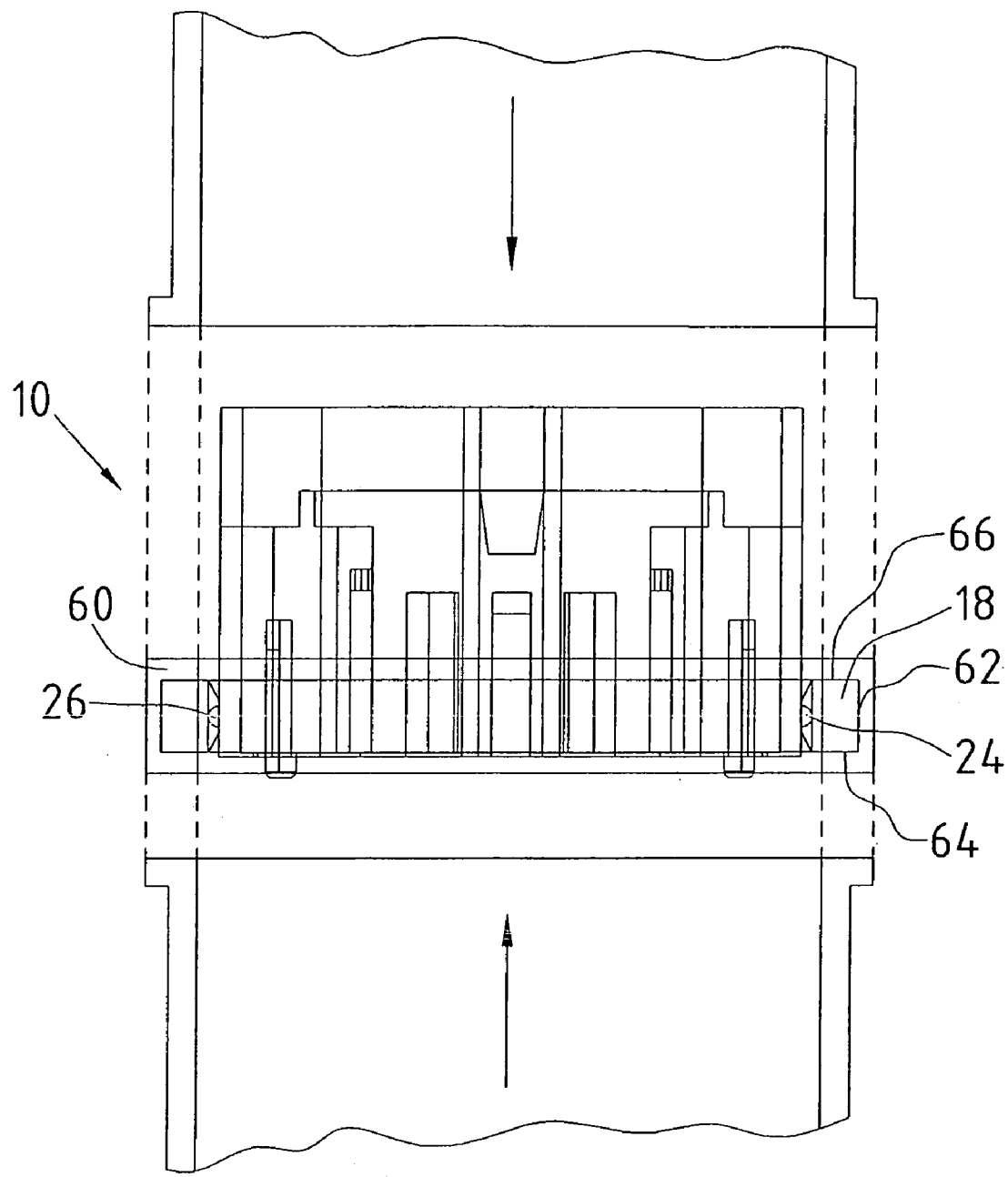
Figure 3:
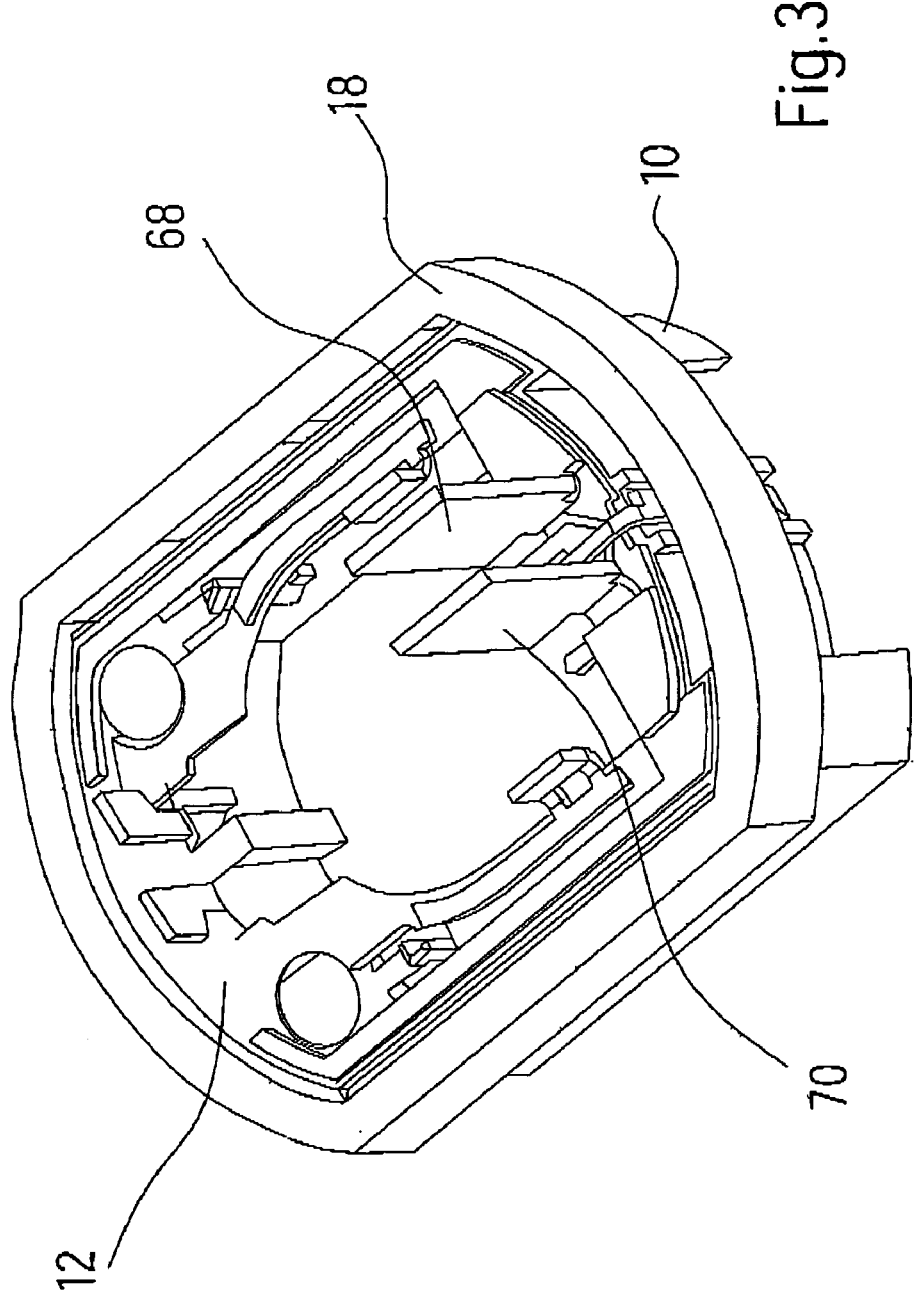
Figure 4:
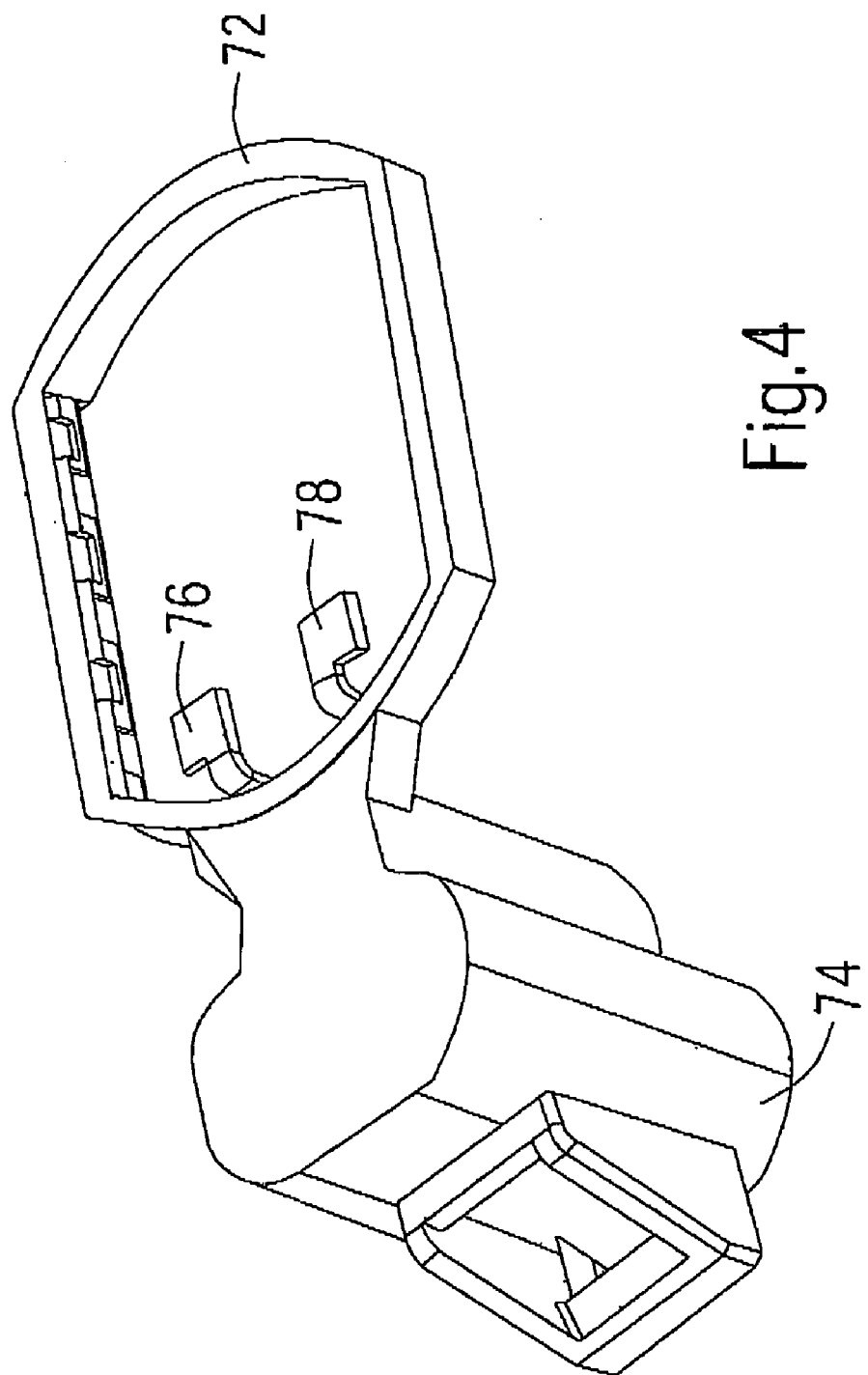
Figure 5:
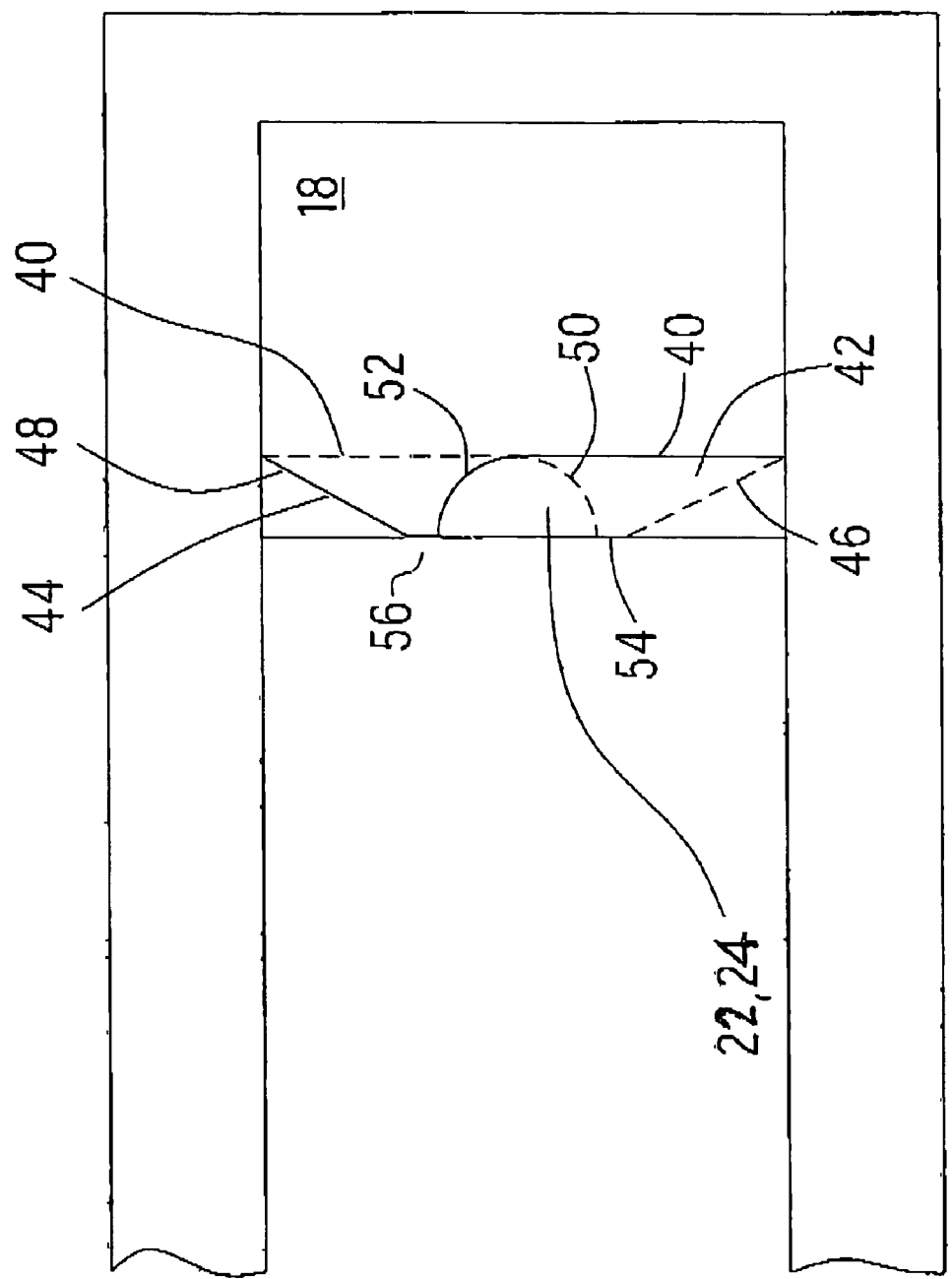

The invention will be explained in greater detail below on the basis of preferred exemplary embodiments to be inferred from the drawing, wherein:

FIG. 1 Illustrates a carrier for carbon brushes with frames oriented toward these, FIG. 2 illustrates the carrier according to FIG. 1 with locked on frame, FIG. 3 is a perspective representation of a carrier with locked on frame and internal plug, FIG. 4 Illustrates a frame with external plug and FIG. 5 illustrates a section through a frame with encapsulation.

Figure 6:
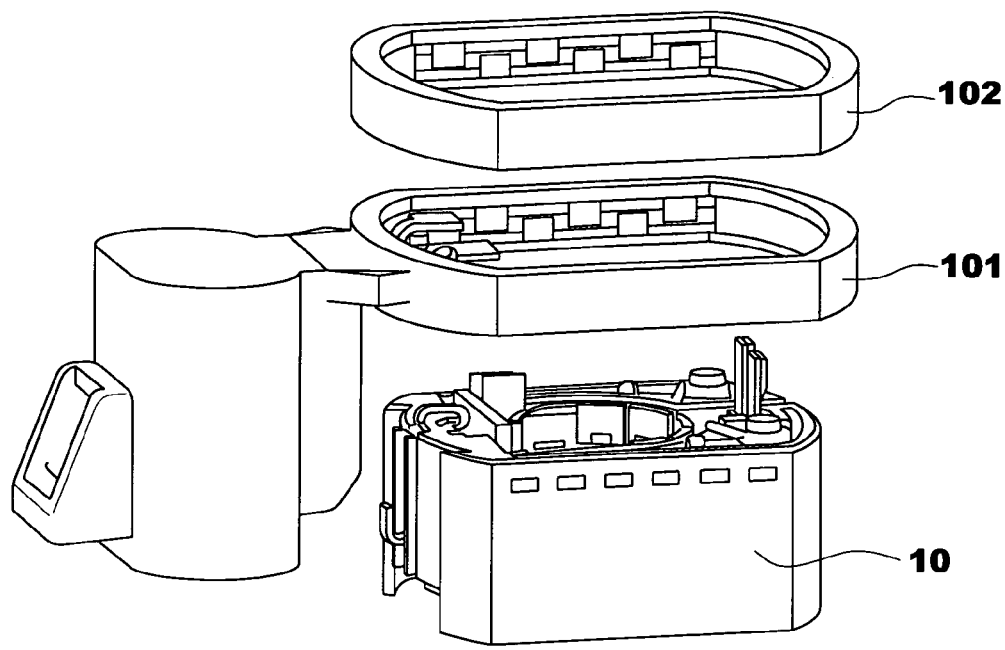

FIG. 6. is a perspective view of the assemblage of FIG. 1 and 4.

Figure 7:
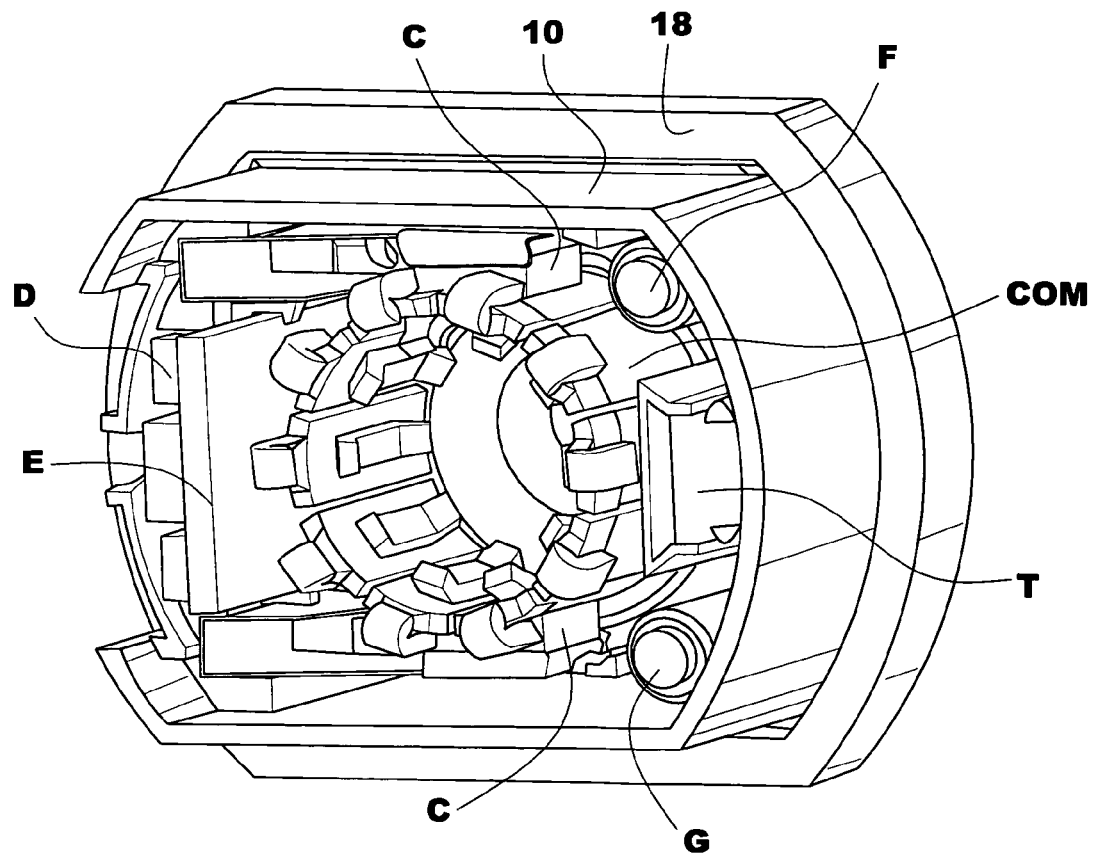

FIG. 7 is a perspective of the carrier of FIG. 3 showing installed components.

A carrier 10 especially designed for a motor-transmission unit, for example, widow raisers, seats or sliding roofs of a motor vehicle that is outfitted with carbon brushes C as well as other electrical and electronic components necessary for a motor, such as interference suppression coils, condensers or thermostats as represented in FIGS. 1 and 7. The carbon brushes C lie under spring force on the commutator COM of the motor in a known manner. The shaft of the motor, not shown, extends into transmission housing to drive a transmission via which, for example, the widow raiser, the seat or the sliding roof is adjustable. Moreover, the shaft penetrates an opening 12 in partition 14 of the carrier 10 that is designated as a floor partition. The floor partition 14 runs on the transmission housing side, in contrast to which carrier 10, that is, its peripheral partition 16, basically extends in the motor housing.

A frame 18 is braced in the interface between the transmission housing and the motor housing, which in accordance with the invention is an element separate from the carrier 10, but can be connected with this, especially form-locking and free of play. For this, locking projections 22, 24 proceed from the peripheral partition 16, that is the outer surface 20, to which projections locking recesses 25, 26 are allocated, which are provided in the internal surface or interior 28 of the frame 18. Moreover the locking projections 22, 24 preferably run exclusively in the regions of the carrier 10 in which there exists a great rigidity, as in the corner regions.

In order to assure the necessary freedom from play, without requiring an expensive tool for producing the locking recess 25, 26 in the frame 18, it is provided that the locking recesses 25, 26 are composed of successive first and second locking elements 28, 30 or 32, 34 which are respectively separated from one another by pegs 36, 38. The first and second locking elements 28, 30, 32, 34 moreover form a semicircular shape in projection along the respective frame segment 40, from which the first and second locking elements 28, 30, 32, 34 proceed, as the section representations in FIGS. 2 and 5 make clear. In order to attain this structure, successive first and second locking elements 28, 30, 32, 34 have an identical shape, which nonetheless runs in the opposite direction. This is basically to be clarified on the basis of FIG. 5.

The locking recesses 25, 26 arranged in series to form the first and second locking elements 28, 30, 32, 34 are represented in section, from which a first [locking element] is represented in dotted lines and designated by the reference number 42 for clarification. A second locking element 44 is made recognizable by the solid line. One will recognize from the representation that the first and second locking elements 42, 44 have an identical shape but with opposite course. Moreover each locking element 42, 44 is comprised by an external ramp-like section 46, 48 and an interior section 50, 52 that follows a quarter circle and transitions tangentially into the interior surface 40 of the frame 18. If need be, a plateau-like section 54, 56 can be provided between the outer section 46 or 48 and the internal section 50, 52 boundary surface side following a quarter circle geometry that runs parallel to the interior surface 40. The goal here is to prevent a sharp edge between the external section 46, 48 and the internal section 50, 52.

A groove that corresponds in section to a semicircle bounded by the internal sections 50,52 emerges as the locking recesses 25, 26 into which the locking projections 22, 24 can lock free of play through the course of the first and second locking elements, 42, 44.

The locking projection 22, 24 therefore has a shape that corresponds to the locking recess 25, 26, thus on the exterior that of a semicylinder, which preferably proceeds flush into a cuboidal section that projects over the outer surface 20 of the carrier 10.

FIG. 5 further communicates the feature that the frame 18 can in particular be encapsulated with a sealing material to assure a desired sealing between the motor housing and the transmission housing of the motor-transmission unit between which the frame 18 is braced.

FIG. 2 reproduces a side view of the carrier 10 with the frame 18 locked on this, which is encapsulated. Moreover, a correspondingly injected-on layer 60 extends along the free surface of the frame 18, in other words its circular front face 62 and its underside 64 and upper side 66. The inner surface or interior 40 facing the housing is in contrast not coated.

The carrier 10 with the coated frame 18 locked onto it in perspective in FIG. 3. One further recognizes the floor partition 12 with corresponding projections and pins for accommodating electrical and electronic components D, E, and T, where E is a printed circuit board and T is a thermostat as well as the carbon brushes C. Additional components such as chokes F and G are also shown in FIG. 7. Nonetheless the internal contacts 68, 70 are represented, via which current is fed to the carbon brushes C in order to permit operation of the motor. The internal contacts 68, 70 reach into the region of the transmission housing when carrier 10 is installed, where corresponding electrical terminals can run.

There also exists the possibility of providing a separately produced frame 72 with a shoulder 74 to enable a power supply through external contacts. Electrical conduits are passed through the shoulder 74 in order to supply electrical and electronic components in the not represented carrier, including the carbon brushes, with power, or else to transmit signals. For this, contacts 76, 78, among other things, are present which extend proceeding from the shoulder 74 or frame 72 into the interior of the carrier for the required contacting.

Moreover, regardless of the configuration of the frame 72, the latter can be slid on one of the carriers corresponding to FIG. 1 to 3 and locked. In order to facilitate this, the internal dimensions of the frames 18, 72 are slightly smaller than external dimension of the carrier 10.

The possibility exists through the theory of the invention of outfitting identical carriers with different frames to satisfy different requirements. This results in the advantage that a sampling is basically only necessary for the frame since identical carriers are used for different frames that need be sampled only once. FIG. 6 shows the use of two frames 101 and 102 of different configurations that are used with the same carrier 10.

A further advantage of the theory of the invention is to be seen in that the possibility exists of having the locking projections 24 project at desired heights from the outer surface 20 of the carrier 10 by moving the outer casing of an injection-molding tool so that accordingly the lockable frame can run at various heights. There consequently exists the possibility of arranging the carrier 10 basically exclusively inside the motor housing or partially in the motor housing and partially in the transmission housing corresponding to space conditions in the motor housing or the transmission housing.

If the theory of the invention is explained on the basis of a motor-transmission unit that is designed in particular for activating elements present in a motor vehicle such as window raisers, seat or sliding roofs, no restriction should take place through this. Rather, the basic concept of the modular construction of carrier and the frame surrounding this are to be applied all inclusively.

The invention claimed is:

1. In a pot-shaped carrier system that comprises carbon brushes and at least one electrical interconnection and which surrounds a commutator of an electric motor, and a frame that extends from the peripheral surface of the carrier and projects between a motor housing and a transmission housing, and being fixed in position peripherally over the carrier, the improvement comprising, said frame is selected from several frames of different configurations, and that the carrier is connected to said frame by means of locking projections and locking recesses provided on the carrier and the frame.

2. A pot-shaped carrier system according to claim 1, wherein the locking projections (22, 24) are comprised by an internal cuboidal segment extending from the external surface (20) and a semicylindrical external section, which transition flush into each other.

3. A pot-shaped carrier system as defined in claim 1, wherein said locking recesses consist of successive first and second locking elements (42, 44) that form semicircular receptacles for external sections of the locking projections along a straight line in section.

4. A pot-shaped carrier system according to claim 3 wherein the locking recesses (25, 26) extend from the interior (40) of the frame (18, 72) or the outer surface (20) of the carrier (10), to which recesses the locking projections (22, 24) that project over the outer surface of the carrier or the interior of the frame are allocated.

5. A pot-shaped carrier system according to claim 3 wherein the first and second locking elements (42, 44) are comprised of a ramp-like outer section (46, 48) and an internal section (50, 52) that follow a quarter circle geometry on the boundary exterior, which transitions flush into the interior (40) of the frame (18).

6. A pot-shaped carrier system according to claim 5 wherein a median section ((54, 56) extends plateau-like between the internal section (50, 52) section (50, 52) and the outer section (46, 48).

7. A pot-shaped carrier system according to claim 3 wherein the first and second locking elements (42, 44) have the same shape, but are oriented in opposite directions in relation to each other.

8. A pot-shaped carrier system according to claim 3 wherein a peg (36, 38) extends between successive first and second locking elements (42, 44).

9. A pot-shaped carrier system according to claim 3 wherein the frame (18) has a sealing material on its free external surfaces.

10. A pot-shaped carrier system according to claim 9 wherein the frame (18) is partially encapsulated with the sealing material.

11. A pot-shaped carrier system according to claim 3 wherein a shoulder (74) for an external plug extends from the frame (72).

12. A pot-shaped carrier system according to claim 3 wherein the frame (18, 72) has sides with rectangular cross sections.

13. A pot-shaped carrier system according to claim 3 wherein the locking projection (22, 24) comprise an internal cuboidal segment extending from the external surface (20) and a semicylindrical external section, which transition flush into each other.

* * * * *